United States Patent Office 3,565,768
Patented Feb. 23, 1971

3,565,768
PROCESS FOR REFINING 4,4'-METHYLENEBIS (CYCLOHEXYL ISOCYANATE)
Benton Robinson Grant, Jr., Wilmington, and Carl Francis Irwin, New Castle, Del., assignors to E. I. du Pont de Nemours and Company, Wilmington, Del., a corporation of Delaware
No Drawing. Filed Apr. 19, 1968, Ser. No. 722,559
Int. Cl. B01d *3/10;* C07c *119/04*
U.S. Cl. 203—73                                                     5 Claims

ABSTRACT OF THE DISCLOSURE

Crude 4,4'-methylenebis(cyclohexyl isocyanate) is refined by (1) removing most of the phosgenation solvent by distillation at less than about 180° C., (2) continuing solvent distillation at higher temperatures, (3) removing a minor amount of the 4,4'-methylenebis(cyclohexyl isocyanate) by distillation at a pressure below about 3 mm. Hg in equipment providing limited residence time, and (4) distilling the bulk of the 4,4'-methylenebis(cyclohexyl isocyanate) from stage (3) at a pressure not exceeding 1.0 mm. Hg.

BACKGROUND OF THE INVENTION 4,4'-methylenebis(cyclohexyl isocyanate), also hereinafter referred to as PICM, is a cycloaliphatic diisocyanate of low volatility which forms non-discoloring polyurethanes and polyureas when reacted with non-discoloring polyols or polyamines. It is of particular value in the preparation of non-discoloring polyurethane coatings and foams.

The most direct method of preparing PICM involves catalytic hydrogenation of methylene dianiline to form bis (4-aminocyclohexyl)methane (PACM) followed by phosgenation. When the synthesis of PICM is carried out using readily available mixtures of stereoisomers of PACM such as the equilibrium mixture described in U.S. 3,155,724, the PICM obtained is a solid at normal operating temperatures, having a melting point of about 58° C. However, when PICM is prepared from PACM containing less than about 23% trans-trans isomer and less than about 72% cis-cis isomer, it is a liquid at temperatures of 25° C. or below. Liquid PICM is described in detail in copending application Ser. No. 637,905.

After phosgenation, PICM is refined by distillation to remove unreacted amine hydrochlorides, phosgenation solvent, phosgenation by-products and other impurities which impair its use in preparing polyurethanes. Conventional distillation, however, does not adequately remove these impurities as it leaves unacceptable quantities of hydrogen chloride, other hydrolyzable chlorides, and color-forming materials of unknown identity. Excess acidity causes instability and promotes discoloration in PICM and color formation is obviously deleterious since PICM's principal use is in making non-discoloring polyurethanes. Moreover, when the isocyanate is liquid PICM, turbidity usually develops in the distilled isocyanate after it has stood for a short period and eventually, highly insoluble solids are deposited. If the solids are merely filtered out, more will form after further standing. While these solids do not prevent the use of liquid PICM in some applications, they present a serious problem for example, in accurately metering a PICM feed to a continuous foam process. Thus, the convenience of storing and handling liquid PICM can be nullified if steps are not taken to prevent the formation of these solids.

Many methods are known for reducing the impurities in isocyanates. Illustrative procedures include (1) treatment at elevated temperatures with metals or metallic oxides such as iron, zinc, copper and silver (British Patent 1,007,087), (2) treatment at elevated temperatures with metal halides and other salts (U.S. Patents 3,155,699 and 3,264,336 both to Powers), and (3) heating the crude isocyanate after removal of the phosgenation solvent to a high temperature prior to distillation to obtain a refined isocyanate (U.S. Patent 3,219,678 to Kober et al.). While these methods are effective in reducing acidity, they do not remove the troublesome color-forming materials. Each method also requires a separate high temperature heating step which causes some decomposition of the isocyanate with a consequent loss in yield.

There is a need, therefore, for a method to refine PICM which is effective in reducing acidity, eliminating color-forming materials and substantially prevents the formation of insoluble residues in liquid PICM.

SUMMARY OF THE INVENTION

According to this invention a process is provided for refining crude 4,4'-methylenebis(cyclohexyl isocyanate) (PICM) which comprises essentially (1) removing solvent from crude PICM by distillation at a temperature not exceeding about 180° C. until the resulting mixture contains not more than about 2–20% by weight solvent based on the combined weight of solvent and PICM, (2) further distilling solvent from the PICM-solvent mixture at a temperature not less than 190° C. and a pressure not greater than 10 mm. mercury in equipment providing a residence time of about 5–60 minutes until the distilland contains not more than 1% by weight solvent based on the combined weight of the PICM and solvent present, (3) removing by distillation not less than about 2–20% by weight of the PICM from the partially refined product obtained from step (2), said distillation being carried out at a pressure not greater than 3 mm. mercury in distillation equipment providing a residence time of less than 30 minutes, and (4) distilling the bulk of the PICM remaining from step (3) at a pressure not greater than 1.0 mm. mercury in equipment providing a residence time of less than 30 minutes.

DETAILED DESCRIPTION

The term "comprising essentially" as used herein, means that the process steps recited in the "Summary of the Invention" and claims are essential to the invention, however, additional steps can be used provided they do not interfere with proper operation of the invention.

The term "crude 4,4'-methylenebis(cyclohexyl isocyanate)" means the undistilled product resulting from the phosgenation of PACM, containing at least some and preferably all of the phosgenation solvent, by-products, hydrolyzable chlorides and other contaminants, as well as PICM.

The "acidity" of PICM referred to herein is measured by adding a sample of PICM to n-propyl alcohol, agitating for 10 minutes at room temperature and potentiometrically titrating the liberated hydrogen chloride with dilute methanolic potassium hydroxide. The result is normally reported as percent or p.p.m. of hydrogen chloride based on the weight of isocyanate. This procedure is described in "Tentative Methods of Testing Urethane Foam Raw Materials," 1960 Supplement of the Book of ASTM Standards, Part 9, pages 124–128, ASTM Designation, D1638–60T.

The solvent referred to herein can be any organic liquid which is suitable as a medium in which to carry out the phosgenation of PACM to PICM by procedures well known in the art. Solvents commonly used are monochlorobenzene and o-dichlorobenzene (ODCB). Because of the high temperatures required to convert PACM to PICM efficiently, the higher boiling ODCB is preferred.

The term "liquid PICM" as used herein means any PICM containing less than about 23% trans-trans isomer and less than about 72% cis-cis isomer, as described in copending application Serial No. 637,905.

The bulk of the solvent is removed from crude PICM by distillation in the first stage of the process of this invention. The bottoms temperature preferably ranges from about 140–180° C. during this stage depending on the solvent used, the distillation pressure and the extent to which solvent is removed, but should not exceed 180° C. Distillation in this temperature range is continued until the solution contains from about 2–20% and preferably 5–10% by weight solvent, based on the combined weight of solvent and PICM. In stage (2), the temperature of the PICM-solvent solution is raised to not less than 190° C. and distillation of the solvent continued at not greater than 10 mm. mercury pressure. During distillation at this temperature, small amounts of PICM may also be removed since only limited fractionation may be employed at such low pressure. Distillation under these conditions is continued until not more than about 1% by weight of the solvent, based on the combined weight of solvent and PICM, remains in the PICM mixture, and preferably until only traces of solvent remain. The length of time over which the PICM resides in this step should be in the range of 5–60 minutes. In stage (3), the distilland from step (2) is distilled at a pressure not greater than 3 mm. mercury pressure in equipment providing a residence time of less than 30 minutes to remove from about 2–20% and preferably 2–5% by weight of the PICM. Refined PICM is then obtained in stage (4) from the partially refined residue of stage (3) by distillation of the PICM at a pressure not greater than 1.0 mm. mercury in equipment providing a residence time of less than 30 minutes.

The term "residence time" as used herein denotes the average length of time that the material being distilled remains in the still at the distillation temperature as is understood by those skilled in the art.

Conventional batch or continuous fractional distillation equipment is satisfactory for carrying out stage (1) of this process. For stage (2), conventional distillation equipment designed to operate at 10 mm. Hg or below is suitable. While stage (3) of the process can be carried out in conventional equipment with low pressure drop, it is preferred to use specialized stills that are regularly used to distill high boiling, heat-sensitive materials. The latter stills are required for stage (4) in which pressures not greater than 1.0 mm. Hg are used. In the specialized stills having short residence times required for stage (4) and preferred for stage (3), the material being distilled is usually fed continuously to the still and distilled product and undistilled material are withdrawn continuously. Representative equipment of this type includes wiped film stills as described in U.S. Pat. 2,955,990 to Smith and U.S. Pat. 2,927,634 to Gudheim, spinning disc stills as described in U.S. Pat. 2,210,928 to Hickman, rising film evaporators as described in British Pat. 835,645, falling film evaporators as described in U.S. Pat. 3,198,241 to Baird and spray type stills as described in U.S. Pat. 2,343,666 to Hickman. It is important that the distillation equipment used in stage (4), and preferably in stage (3), be of these types and that the distillation be carried out at a temperature such that the vapor pressure of the liquid is not higher than those indicated, otherwise considerable decomposition of the PICM may occur.

No temperature is specified for stages (3) and (4) because of the practical difficulties encountered in reliably measuring the temperature of liquids in the form of a moving film or a spray. The measurement of the pressure in the proximity of the gas-liquid interface from which the PICM is vaporizing is however relatively simple. As is well known, establishing the pressure of distillation fixes the temperature of distillation for a given substance. Pressures in the range of 1–3 mm. Hg can be measured with closed leg mercury manometers or McLeod gages. Pressures below about 1 mm. of Hg can be measured with McLeod gages or with thermal gages such as the Pirani gage. Gages of these types are described in Perry's "Chemical Engineers' Handbook," 3rd edition, McGraw-Hill, 1950, pages 1280–1282. The pressure values indicated in stages (3) and (4) are made as closely as practical to the surface of the vaporizing liquid. There are no obstructions between the point of measurement and the vaporizing liquid which would result in misleading pressure differentials.

PICM refined by the process of this invention contains less than about ten parts per million acidity and is substantially free of undesirable color-forming materials. In addition, liquid PICM refined in this manner is substantially free of solids even after standing for long periods. Thus, PICM so refined is particularly well suited for use in preparing a variety of non-discoloring polyurethanes.

The invention is further illustrated by the following example wherein parts and percentages are by weight unless otherwise indicated.

EXAMPLE

A PACM sample having an approximate isomer composition of trans-trans 19%, cis-trans 62%, cis-cis 14% and 2,4'-di(amino cyclohexyl)methane 5% is phosgenated by the process of U.S. Patent 2,822,373 employing an equipment arrangement substantially equivalent to that described in the same patent. A 13% solution of PACM in o-dichlorobenzene is fed to the equipment at a rate of 77 parts/hr. Phosgene is introduced at a rate of 14.1 parts/hr. in the form of a 7% solution in o-dichlorobenzene. The quantity of phosgene corresponds to an excess above theory of 50%. The temperature throughout the recirculation loop and the reservoir of the equipment is maintained at about 165° C. The pressure in the reservoir is 5 p.s.i.g. while that in the loop is 20 p.s.i.g. The weight of material contained in the reservoir is such that the average residence time of the phosgenation mass in the equipment is about 2 hours. Material from the reservoir is recirculated through the loop at a rate of about 650 parts/min. Reaction mass is removed from the reservoir at a rate which maintains the liquid volume of the system at a constant value. The material leaving the reservoir is fed to a stirred vessel where it is contacted at 165° C. with 10 parts/hr. of phosgene at a pressure of 20 p.s.i.g. for about 30 minutes. The reaction mass removed from the stirred vessel is heated to boiling at about atmospheric pressure to remove dissolved phosgene and hydrogen chloride.

Following the removal of phosgene and hydrogen chloride, the crude product contains 6.7% PICM and about 93% o-dichlorobenzene. Solvent is removed by fractional distillation at reduced pressure. Toward the end of this distillation the bottoms temperature in the still is 170–175° C. at 25 to 30 mm. Hg. The distilland, which contains 5–7% o-dichlorobenzene, is forwarded to continuous distillation equipment in which the bottoms temperature is maintained at 192–197° C. at a pressure of 5 to 6 mm. Hg. The average residence time in the still is about 15 minutes. The distilland from this step contains from 0.01 to 0.15% o-dichlorobenzene. The distilland is then passed through a wiped film still of the type described in U.S. Patent 2,955,990 to Smith, operated at a pressure of about 1 mm. Hg and an outside wall temperature of 156° C. Material is fed through the still at a rate such that 2.5% of the PICM fed is distilled. The undistilled material from this step is fed to the wiped film still a second time to distill the bulk of the PICM. The still is operated at a pressure of 0.160 mm. Hg measured near the heated wall on which the undistilled PICM film is formed. The outside wall temperature is 194° C. The feed rate to the still is such that 8 to 9 parts of PICM distills for each part of distilland leaving the still.

The properties of the distilled PICM are as follows:

NCO: 31.9% (theory 32.04%)
o-Dichlorobenzene: 0.01%
Acidity: About 1 p.p.m.
Hydrolyzable chlorine: 0.008%
Total chlorine: 0.070%
APHA color scale[1]: 10

[1] ASTM D–1638 59T, procedure for color of toluene-diisocyanate.

After storage for 4 months in closed containers, there is no sign of solids formation and the color is 10–20 on the APHA scale.

What is claimed is:
1. A process for refining crude 4,4'-methylenebis(cyclohexyl isocyanate) comprising essentially
  (1) removing phosgenation solvent from crude 4,4'-methylenebis(cyclohexyl isocyanate) by distillation at a temperature not exceeding about 180° C. until the distilland contains about 2–20% by weight solvent based on the combined weight of solvent and 4,4'-methylenebis(cyclohexyl isocyanate),
  (2) further distilling phosgenation solvent from the 4,4'-methylenebis(cyclohexyl isocyanate) obtained from step (1) at a temperature not less than 190° C. and a pressure not greater than 10 mm. mercury in equipment providing a residence time of 5–60 minutes until the distilland contains not more than about 1% by weight solvent based on the combined weight of 4,4'-methylenebis(cyclohexyl isocyanate) and solvent present,
  (3) removing by distillation from about 2–20% by weight of the 4,4'-methylenebis(cyclohexyl isocyanate) from the product obtained in step (2), said distillation being carried out at a pressure not greater than 3 mm. mercury in equipment providing a residence time of less than 30 minutes, and
  (4) distilling the bulk of the 4,4'-methylenebis(cyclohexyl isocyanate) obtained from step (3) at a pressure not greater than 1.0 mm. mercury in equipment providing a residence time of less than 30 minutes.

2. The process of claim 1 wherein the solvent is o-dichlorobenzene.
3. The process of claim 1 wherein the 4,4'-methylenebis(cyclohexyl isocyanate) is liquid 4,4'-methylenebis(cyclohexyl isocyanate).
4. The process of claim 1 wherein the distilland at the completion of stage (1) contains from about 5–10% by weight solvent.
5. The process of claim 1 wherein about 2–5% by weight of the 4,4'-methylenebis(cyclohexyl isocyanate) is removed in step 3.

References Cited

UNITED STATES PATENTS

| | | | |
|---|---|---|---|
| 2,884,362 | 4/1959 | Bloom et al. | 260—453X |
| 3,211,631 | 10/1965 | Fuchs | 260—453X |
| 3,410,888 | 11/1968 | Hammond | 260—453 |
| 3,471,543 | 10/1969 | Sayigh | 260—453 |

CHARLES B. PARKER, Primary Examiner

D. H. TORRENCE, Assistant Examiner

U.S. Cl. X.R.

203—72, 89; 260—2.5, 75, 77.5, 453, 563